Patented Nov. 21, 1933

1,935,721

UNITED STATES PATENT OFFICE 1,935,721

MANUFACTURE OF NITROGENOUS COMPOUNDS DERIVED FROM PERYLENEQUINONE

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application November 14, 1929, Serial No. 407,273, and in Germany December 1, 1928

7 Claims. (Cl. 260—61)

The present invention relates to the manufacture of nitrogenous compounds derived from perylene quinone.

We have found that new and valuable compounds containing nitrogen which are in part suitable as intermediate products for the manufacture of dyestuffs and in part as dyestuffs, are obtainable when perylene quinone, ms-benzdianthrone, ms-naphthodi-anthrone, allo-ms-naphthodianthrone, ms-anthradianthrone or their methyl or halogen derivatives are subjected to the action of hydroxylamine or its salts, preferably in an acid inorganic dissolving or suspending medium capable of splitting off water, such as for example sulfuric acid, phosphoric acid, chlorosulfonic acid and the like. Condensing catalysts, for example metals or metal compounds, such as iron, copper, mercury and the like, or iron or copper sulfate, may be added to the reaction mixture.

By the process in accordance with the present invention, the manufacture of the perylene quinones from intermediate products and the treatment with hydroxylamine may be advantageously effected in one working operation, whereby in some cases products different from those produced from the ready-made perylene quinones are obtained. Thus, for example, when treating perylene in concentrated sulfuric acid with hydroxylamine, a nitrogenous compound of perylene quinone is obtained which is different from that obtained by the action of hydroxylamine on perylene-3.10-quinone. When treating ms-benzdianthrone in concentrated sulfuric acid with hydroxylamine further condensation to a derivative of ms-naphthodianthrone takes place by the addition of oxidizing agents, such as, for example, pyrolusite, or by simply raising the temperature. Likewise when starting from 1.1'-dianthraquinonyl, this may be converted into ms-benzdianthrone by the action of reducing agents in sulfuric acid solution, the ms-benzdianthrone being converted by the simultaneous or consecutive action of hydroxylamine into a nitrogenous derivative.

Particularly valuable dyestuffs obtainable according to our invention are, due to their good affinity to vegetable fibers, those of the new nitrogenous compounds as are derived from perylene quinones in which two anthracene rings are connected to each other by at least two hexagon rings, that is to say, the nitrogenous compounds derived from ms-naphthodianthrone, allo-ms-naphthodianthrone and ms-anthradianthrone.

The compounds which are obtainable in excellent yields dissolve in concentrated sulfuric acid usually to give a red-violet, blue or green coloration and their vat solutions are usually from violet red to blue in color; cotton is dyed a great variety of shades from these vats. The crude compounds containing nitrogen may be purified, if desired, by boiling up with organic solvents, or by treating pastes of the same with oxidizing agents, for example with alkali metal hypochlorite, or by dissolving them in concentrated sulfuric acid reprecipitating them from the said solution by the addition of water or dilute sulfuric acid.

The following examples will further illustrate the nature of this invention, but the invention is not restricted to these examples. The parts are by weight.

*Example 1*

58 parts of perylene-3.10-quinone are dissolved in 1000 parts of concentrated sulfuric acid and after the addition of 100 parts of ferrous sulfate and 80 parts of hydroxylamine sulfate the whole is heated up to from 140° to 150° C., while stirring. The whole is maintained at the same temperature until a sample taken out when poured into ice water separates out in the form of a flocculent grey violet precipitate. The reaction mixture is then allowed to cool, is poured onto ice and filtered off by suction. The reaction product which contains nitrogen dissolves in concentrated sulfuric acid giving a violet coloration, and gives a violet vat from which cotton is dyed grey shades which become orange under the action of hypochlorite or chlorine.

*Example 2*

25.2 parts of perylene are introduced, while stirring, at ordinary temperature into a suspension of 40 parts of hydroxylamine sulfate and 100 parts of ferrous sulfate in 500 parts of concentrated sulfuric acid. The temperature is slowly raised to from 140° to 170° C. and the whole is kept at this temperature until the color of the reaction mass has become pure blue. When cooled, the reaction product separates out in the form of the oxonium sulfate which is either filtered off by suction, decomposed with water and isolated in the usual manner or is poured directly into ice water and isolated.

The reaction product obtained, which is a black powder is practically insoluble in all organic solvents and only dissolves with difficulty in concentrated sulfuric acid giving a blue coloration in contradistinction to the product obtainable according to Example 1 which is more readily soluble in concentrated sulfuric acid. It contains nitrogen and yields a violet vat from which cotton is dyed grey shades.

*Example 3*

38 parts of ms-benzdianthrone are dissolved, while stirring, in 600 parts of concentrated sulfuric acid. After the addition of 19 parts of hydroxylamine sulfate and 50 parts of ferrous sulfate the temperature is slowly raised to from 150° to 170° C. and the whole is kept at this temperature until the solution has become violet red in color. The whole is then allowed to cool and is worked up as described in Example 1. The reaction product obtained, which as proved by analysis contains one nitrogen atom in the molecule, is a brown violet powder which gives red brown dyeings on cotton from a green vat.

*Example 4*

203 parts of 2.2'-dimethyl-ms-naphthodianthrone are dissolved, while stirring, in 5000 parts of concentrated sulfuric acid and after the addition of 200 parts of hydroxylamine sulfate and 500 parts of ferrous sulfate, the whole is slowly heated to from 160° to 170° C. and kept at this temperature until a sample taken out yields a flocculent brown precipitate upon the addition of water. It is then worked up in the usual manner. The condensation product containing nitrogen thus obtained, which is a brown powder, dissolves in concentrated sulfuric acid giving a violet coloration and constitutes a valuable intermediate product for the manufacture of dyestuffs.

*Example 5*

100 parts of allo-ms-naphthodianthrone are dissolved, while stirring, in 1000 parts of concentrated sulfuric acid. 50 parts of hydroxylamine sulfate and 500 parts of ferrous sulfate are added to this solution at ordinary temperatures and the whole is heated to from 140° to 160° C. When the initial emerald green coloration has changed through a blue to pure violet the reaction product is worked up as described in Example 1. The reaction product containing nitrogen obtained, which is a violet black powder, dissolves in concentrated sulfuric acid giving a violet coloration and dyes cotton powerful grey shades from a blue vat.

*Example 6*

5.4 parts of dibromoperylene-3.10-quinone (obtainable by brominating perylene-3.10-quinone in aqueous suspension) are dissolved in 54 parts of concentrated sulfuric acid. After the addition of 2 parts of hydroxylamine hydrochloride the temperature of the reaction mixture is raised, while stirring, to 170° C. and kept thereat for several hours, the reaction mixture being then allowed to cool and worked up in the usual manner. The reaction product containing bromine and nitrogen thus obtained dissolves in concentrated sulfuric acid to give a blue red solution and dyes cotton from a violet vat grey brown shades.

What we claim is:—

1. Nitrogenous derivatives of a compound selected from the group consisting of perylenequinone, ms-benzdianthrone, ms-naphthodianthrone, allo-ms-naphthodianthrone, ms-anthradianthrone, which may be substituted by methyl or halogen dissolving in concentrated sulfuric acid to give from red violet to green solutions and giving from violet to blue vats, the said products being obtainable by heating one of the said compounds with hydroxylamine.

2. Nitrogenous derivatives of dianthrones corresponding to the formula:

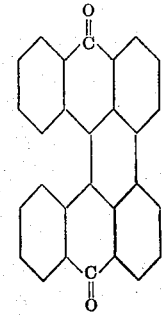

in which the two anthrone nuclei are connected with each other with at least one further hexagon ring, which nitrogenous derivatives dissolve in concentrated sulfuric acid to give from red to violet solutions and dyeing cotton from blue red to blue green vats brown to grey shades, and are obtainable by heating one of the said dianthrones with hydroxylamine.

3. The process of producing nitrogenous compounds, which comprises heating a compound selected from the group consisting of perylenequinone, ms-benzdianthrone, ms-naphthodianthrone, allo-ms-naphthodianthrone, ms-anthradianthrone, which may be substituted by methyl or halogen with hydroxylamine.

4. The process of producing nitrogenous compounds, which comprises heating a compound selected from the group consisting of perylenequinone, ms-benzdianthrone, ms-naphthodianthrone, allo-ms-naphthodianthrone, ms-anthradianthrone, which may be substituted by methyl or halogen with hydroxylamine in the presence of an inorganic acid capable of splitting off water.

5. The porcess of producing nitrogenous compounds, which comprises heating a compound selected from the group consisting of perylenequinone, ms-benzdianthrone, ms-naphthodianthrone, allo-ms-naphthodianthrone, ms-anthradianthrone, which may be substituted by methyl or halogen with hydroxylamine in the presence of an inorganic acid capable of splitting off water and a condensing catalyst.

6. The process of producing nitrogenous compounds, which comprises heating a compound selected from the group consisting of perylenequinone, ms-benzdianthrone, ms-naphthodianthrone, allo-ms-naphthodianthrone, ms-anthradianthrone, which may be substituted by methyl or halogen with hydroxylamine in the presence of concentrated sulfuric acid.

7. The process of producing an aminoperylene-3.10-quinone, which comprises heating perylene-3.10-quinone with hydroxylamine in the presence of concentrated sulfuric acid and ferrous sulfate.

MAX ALBERT KUNZ.
KARL KOEBERLE.